US012436496B2

(12) United States Patent
Shao et al.

(10) Patent No.: US 12,436,496 B2
(45) Date of Patent: Oct. 7, 2025

(54) PROCESS CARTRIDGE, PROCESS CARTRIDGE ASSEMBLY, AND IMAGE-FORMING APPARATUS

(71) Applicant: Zhuhai Pantum Electronics Co., Ltd., Zhuhai (CN)

(72) Inventors: Zhe Shao, Zhuhai (CN); Xiangchao Xia, Zhuhai (CN); Hongjian Yang, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 0 days.

(21) Appl. No.: 18/757,715

(22) Filed: Jun. 28, 2024

(65) Prior Publication Data

US 2024/0353794 A1 Oct. 24, 2024

Related U.S. Application Data

(63) Continuation of application No. PCT/CN2022/142112, filed on Dec. 26, 2022.

(30) Foreign Application Priority Data

Dec. 29, 2021 (CN) ......................... 202123372434.9
Sep. 30, 2022 (CN) ......................... 202211217029.6

(51) Int. Cl.
*G03G 15/00* (2006.01)
*G03G 15/06* (2006.01)
(Continued)

(52) U.S. Cl.
CPC ....... *G03G 21/1871* (2013.01); *G03G 15/065* (2013.01); *G03G 21/1652* (2013.01);
(Continued)

(58) Field of Classification Search
CPC ............. G03G 15/065; G03G 21/1652; G03G 21/1814; G03G 21/1828; G03G 21/1842; G03G 21/1867; G03G 21/1871
(Continued)

(56) References Cited

U.S. PATENT DOCUMENTS 10,203,658 B2 * 2/2019 Sakai ................. G03G 21/1885
2010/0053684 A1 3/2010 Vinocur et al.
(Continued)

FOREIGN PATENT DOCUMENTS

CN 101542398 A 9/2009
CN 102165379 A 8/2011
(Continued)

OTHER PUBLICATIONS

The World Intellectual Property Organization (WIPO) International Search Report With Translation for PCT/CN2022/142112 Mar. 24, 2023 9 Pages (including translation).

*Primary Examiner* — Hoan H Tran
(74) *Attorney, Agent, or Firm* — Anova Law Group, PLLC

(57) ABSTRACT

The present disclosure provides a process cartridge, a process cartridge assembly, and an image-forming apparatus. The process cartridge includes a cartridge main body; a rotating part where the cartridge main body includes a first portion and a second portion; a chip part where the chip part is disposed on the cartridge main body and includes a contact point portion for being in contact with and electrically connected to an electrical contact portion of the image-forming apparatus; and a positioning portion configured to be supported on a moving part of the image-forming apparatus. A distance between projections of the contact point portion and a reference point onto an axle of the rotating part is L1, and a minimum distance between projections of the reference point and a surface of the position-
(Continued)

ing portion away from the second portion to onto the axle of the rotating part is L2, where L1>L2.

14 Claims, 8 Drawing Sheets

(51) Int. Cl.
*G03G 21/16* (2006.01)
*G03G 21/18* (2006.01)

(52) U.S. Cl.
CPC ..... *G03G 21/1814* (2013.01); *G03G 21/1828* (2013.01); *G03G 21/1842* (2013.01); *G03G 21/1867* (2013.01)

(58) Field of Classification Search
USPC .................................... 399/90, 107, 110, 111
See application file for complete search history.

(56) References Cited

U.S. PATENT DOCUMENTS

| | | | |
|---|---|---|---|
| 2013/0251402 | A1 | 9/2013 | Yamashita et al. |
| 2014/0085662 | A1 | 3/2014 | Miller et al. |
| 2014/0086597 | A1 | 3/2014 | Masato et al. |
| 2016/0139558 | A1 | 5/2016 | Takuya et al. |
| 2020/0133188 | A1 | 4/2020 | Mark et al. |

FOREIGN PATENT DOCUMENTS

| | | | |
|---|---|---|---|
| CN | 103324072 | A | 9/2013 |
| CN | 209657088 | U | 11/2019 |
| CN | 112912801 | A | 6/2021 |
| CN | 115494713 | A | 12/2022 |
| EP | 2941671 | A1 | 11/2015 |
| JP | 2013047776 | A | 3/2013 |
| JP | 2021051280 | A | 4/2021 |

* cited by examiner

PROCESS CARTRIDGE, PROCESS CARTRIDGE ASSEMBLY, AND IMAGE-FORMING APPARATUS

CROSS-REFERENCE TO RELATED APPLICATION

This application is a continuation application of PCT Patent Application No. PCT/CN2022/142112, filed on Dec. 26, 2022, which claims the priority to Chinese patent application No. 202123372434.9, filed on Dec. 29, 2021, and No. 202211217029.6, filed on Sep. 30, 2022, the entirety of all of which is incorporated herein by reference.

TECHNICAL FIELD

The present disclosure generally relates to the field of image-forming technology and, more particularly, relates to a process cartridge, a process cartridge assembly, and an image-forming apparatus.

BACKGROUND

The existing technology provides one type of image-forming apparatuses. A drawer is disposed in the image-forming apparatus. At least one process cartridge is accommodated in the drawer. By pushing and pulling the drawer, the process cartridge can be installed in or removed from the image-forming apparatus. When the process cartridge is installed in the image-forming apparatus, the conductive contact points on the chip disposed on the process cartridge may be in contact with the conductive terminals disposed on the image-forming apparatus.

However, during the process of installing the process cartridge, when the user lifts the drawer relatively high, other parts disposed on the process cartridge may be also in contact with the conductive terminals disposed on the side of the image-forming apparatus. Therefore, the conductive terminals on the side of the image-forming apparatus may be damaged; or after the process cartridge is scratched, debris may adhere to the conductive terminals, which may result in abnormal communication between the conductive terminals disposed on the image-forming apparatus and the chip disposed on the process cartridge.

SUMMARY

One aspect of the present disclosure provides a process cartridge. The process cartridge includes a cartridge main body; a rotating part, disposed on the cartridge main body, where along an axial direction of the rotating part, the cartridge main body includes a first portion and a second portion; a chip part, where the chip part is disposed on the cartridge main body and includes a contact point portion for being in contact with and electrically connected to an electrical contact portion of the image-forming apparatus; and a positioning portion, where the positioning portion is at the first portion and configured to be supported on a moving part of the image-forming apparatus. When the process cartridge is installed in the image-forming apparatus, any point on the second portion is configured as a reference point, a distance between projections of the contact point portion and the reference point onto an axle of the rotating part is L1, and a minimum distance between projections of the reference point and a surface of the positioning portion away from the second portion to onto the axle of the rotating part is L2, where L1>L2.

Another aspect of the present disclosure provides a process cartridge assembly. The process cartridge assembly includes a moving part; and a process cartridge, installed in the moving part and applied to an image-forming apparatus. The process cartridge includes a cartridge main body; a rotating part, disposed on the cartridge main body, where along an axial direction of the rotating part, the cartridge main body includes a first portion and a second portion; a chip part, where the chip part is disposed on the cartridge main body and includes a contact point portion for being in contact with and electrically connected to an electrical contact portion of the image-forming apparatus; and a positioning portion, where the positioning portion is at the first portion and configured to be supported on a moving part of the image-forming apparatus. When the process cartridge is installed in the image-forming apparatus, any point on the second portion is configured as a reference point, a distance between projections of the contact point portion and the reference point onto an axle of the rotating part is L1, and a minimum distance between projections of the reference point and a surface of the positioning portion away from the second portion to onto the axle of the rotating part is L2, where L1>L2. The moving part is disposed with a limiting portion, and the positioning portion of the process cartridge is supported at the limiting portion.

Another aspect of the present disclosure provides an image-forming apparatus. The image-forming apparatus includes a main body, disposed with a moving part and an electrical contact portion; and includes a process cartridge. The process cartridge includes a cartridge main body; a rotating part, disposed on the cartridge main body, where along an axial direction of the rotating part, the cartridge main body includes a first portion and a second portion; a chip part, where the chip part is disposed on the cartridge main body and includes a contact point portion for being in contact with and electrically connected to the electrical contact portion of the image-forming apparatus; and a positioning portion, where the positioning portion is at the first portion and configured to be supported on the moving part of the image-forming apparatus. When the process cartridge is installed in the image-forming apparatus, any point on the second portion is configured as a reference point, a distance between projections of the contact point portion and the reference point onto an axle of the rotating part is L1, and a minimum distance between projections of the reference point and a surface of the positioning portion away from the second portion to onto the axle of the rotating part is L2, where L1>L2. When the process cartridge is installed in the moving part, the contact point portion is electrically connected to the electrical contact portion.

Other aspects of the present disclosure may be understood by those skilled in the art in light of the description, the claims, and the drawings of the present disclosure.

Figure 1:
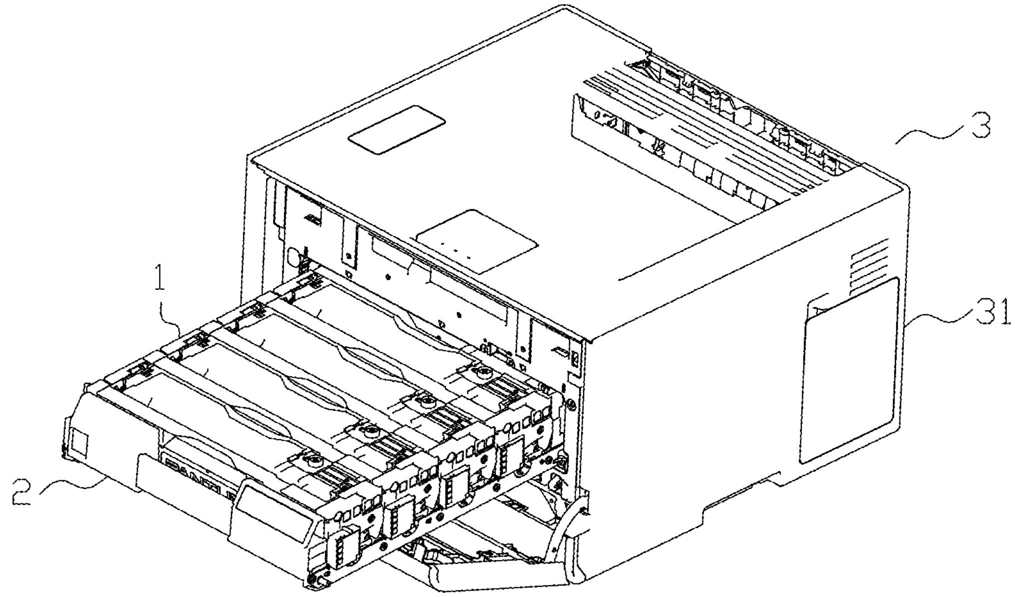
FIG. 1 illustrates a structural schematic of a process cartridge assembly installed in a main body of an image-forming apparatus provided by exemplary embodiments of the present disclosure.

The accompanying drawings, which are incorporated to form a part of the present disclosure, illustrate embodiments of the present disclosure, and together with the specification, describe the principles of the present disclosure.

DETAILED DESCRIPTION

In order to better understand the technical solutions of the present disclosure, embodiments of the present disclosure are described in detail below with reference to accompanying drawings.

It should be understood that described embodiments are only some of embodiments of the present disclosure, rather than all of embodiments. According to embodiments of the present disclosure, all other embodiments obtained by those skilled in the art without making creative efforts should fall within the protection scope of the present disclosure.

The terms used in embodiments of the present disclosure are only for the purpose of describing specific embodiments and not intended to limit the present disclosure. As used in embodiments and appended claims, the singular forms "a", "the" and "said" are also intended to include plural forms, unless the context clearly dictates otherwise.

It should be understood that the term "and/or" used in the present disclosure is only an association relationship describing related objects, which indicates that there may be three relationships. For example, A and/or B may indicate three cases including A alone, both A and B, and B alone. In addition, the character "/" in the present disclosure indicates that related objects are an "or" relationship.

It should be noted that the orientation terms such as "upper", "lower", "left" and "right" described in embodiments of the present disclosure are described from the perspective shown in the drawings and should not be understood as a limitation on embodiments of the present disclosure. In addition, it should be understood in the present disclosure that when an element is referred to as being connected "on" or "under" another element, it may not only be directly connected "on" or "under" another element, but also may be indirectly connected "on" or "under" another element through an intermediate element.

Referring to FIGS. 1-7, embodiments of the present disclosure provide an image-forming apparatus 3. The image-forming apparatus 3 may include a main body 31 and a process cartridge 1. The main body 31 may include a moving part 2 and an electrical contact portion 311. The moving part 2 may move relative to the main body 31. When installing the process cartridge 1, the process cartridge 1 may need to be placed on the moving part 2 first. After the process cartridge 1 is supported and positioned by the moving part 2, the process cartridge 1 may be loaded in the main body 31 by pushing and pulling the moving part 2 to ensure image printing accuracy. When the process cartridge 1 is completely installed in the main body 31, the chip part 12 disposed on the process cartridge 1 and the electrical contact portion 311 disposed on the main body 31 may be in contact with each other, such that the chip part 12 on the process cartridge 1 may be electrically connected to the main body 31 to realize data transmission. The electrical contact portion 311 on the main body 31 may be an elastic piece. The electrical contact portion 311 may press the chip part 12 through its own elasticity to ensure the stability of the electrical connection between the electrical contact portion 311 and the chip part 12.

Figure 4:
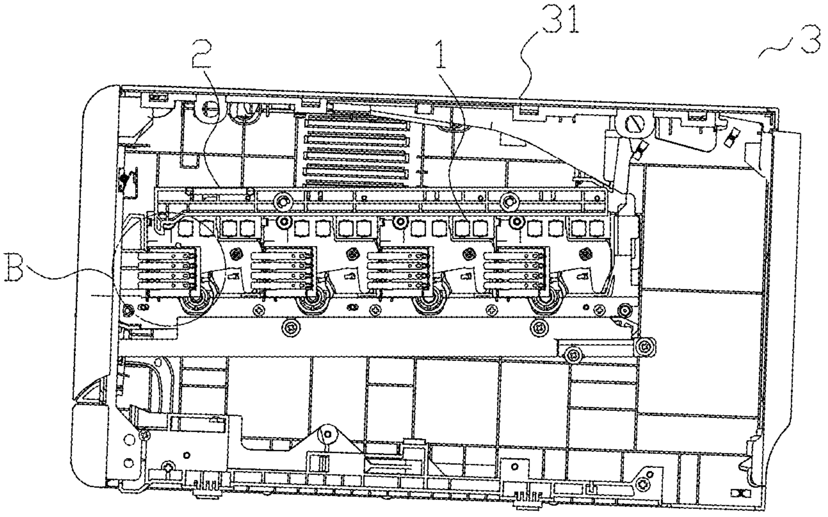
FIG. 4 illustrates a cross-sectional view of a process cartridge assembly installed in a main body of an image-forming apparatus provided by exemplary embodiments of the present disclosure.
Figure 5:
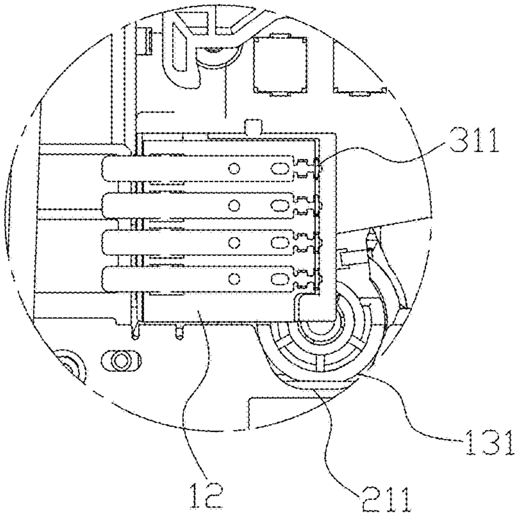
FIG. 5 illustrates an enlarged schematic of a region B in FIG. 4.
Figure 6:
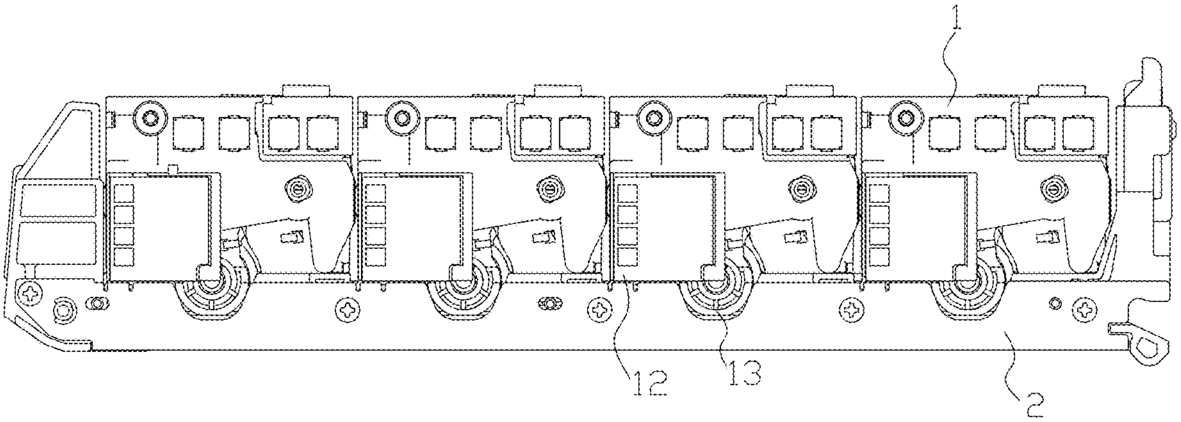
FIG. 6 illustrates a structural schematic of a process cartridge assembly provided by exemplary embodiments of the present disclosure.
Figure 7:
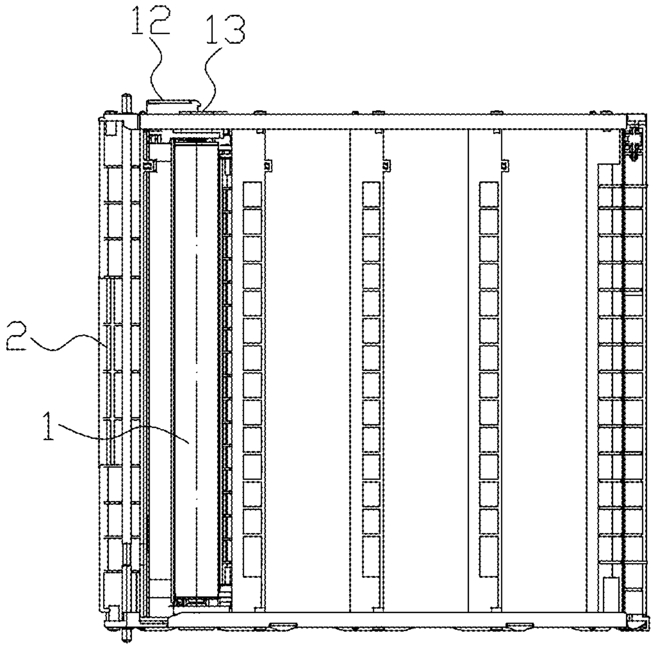
FIG. 7 illustrates a structural schematic of a process cartridge assembly in FIG. 6 from another viewing-angle.

The number of process cartridges 1 may be set to one, two, or more. As shown in FIG. 4, the image-forming apparatus 3 may be installed with four process cartridges 1. The chip part 12 of each process cartridge 1 may be disposed with four contact point portions 121, and the main body 31 may be disposed with four electrical contact portions 311. Four contact point portions 121 may be in contact with four electrical contact portions 311 in a one-to-one correspondence; and correspondingly, the contact point portions 121 and the electrical contact portions 311 may be electrically connected to each other.

In order to ensure the stability of the process cartridge 1 disposed on the moving part 2 and also ensure that the chip part 12 on the process cartridge 1 can be in contact with the electrical contact portion 311 on the main body 31 after the process cartridge 1 is installed in the main body 31 along with the moving part 2, a limiting portion 21 may be disposed at the moving part 2, a positioning portion 13 may be disposed at the process cartridge 1, and the positioning portion 13 may be matched with the limiting portion 21. The positioning portion 13 may be matched with the limiting portion 21 to limit the position of the process cartridge 1 on the moving part 2, such that when the process cartridge 1 is installed in the main body 31 along with the moving part 2, the position of the process cartridge 1 may not change.

For example, as shown in FIGS. 2-5, a portion of the moving part 2 may be recessed to form the limiting portion 21; a first limiting surface 211 may be formed on the inner surface of the limiting portion 21, and a first limited surface 131 may be formed on the outer surface of the positioning portion 13. When the process cartridge 1 is installed in the moving part 2, the first limiting surface 211 may be abutted against the first limited surface 131.

The first limiting surface 211 and the first limited surface 131 may be in full contact or partial contact.

When the process cartridge 1 is installed in the moving part 2, the first limiting surface 211 may be abutted against the first limited surface 131 to limit the process cartridge 1, such that the process cartridge 1 may be kept at same position. The first limiting surface 211 may be formed on the inner surface of the limiting portion 21, and the first limited surface 131 may be formed on the outer surface of the positioning portion 13. The first limiting surface 211 and the first limited surface 131 may be configured as arc-shaped surfaces, thereby limiting the movement of the process cartridge 1 when being pushed and pulled by the moving part 2.

For example, the matching between the positioning portion 13 and the limiting portion 21 may limit the movement of the process cartridge 1 along the pulling direction of the moving part 2; and other structures may be also disposed on the moving part 2 and the process cartridge 1 for limiting the process cartridge 1 along other directions.

The positioning portion 13 may not protrude from the limiting portion 21, or when the positioning portion 13 is matched with the limiting portion 21, a part of the positioning portion 13 may protrude from the limiting portion 21.

Figure 2:
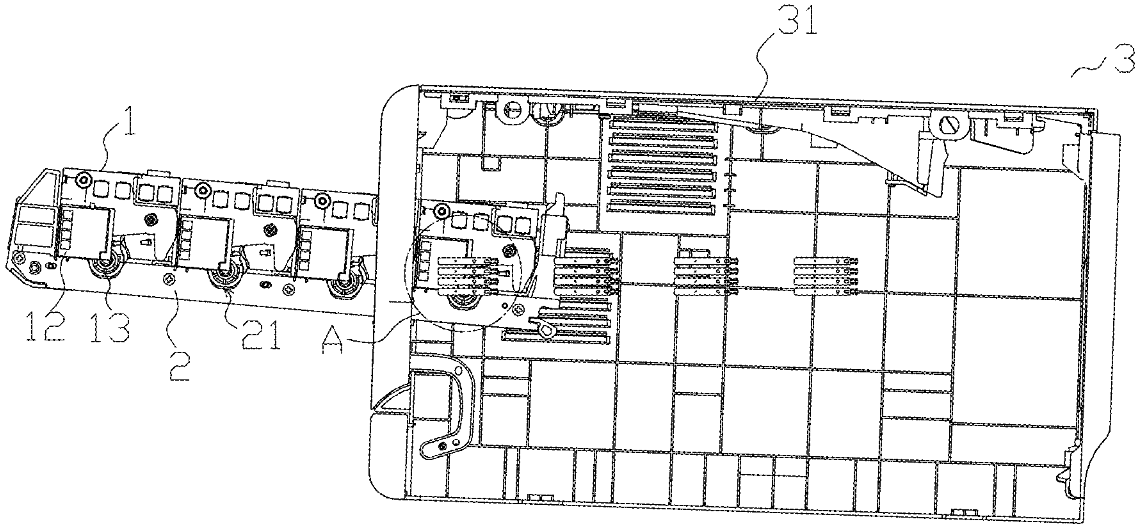
FIG. 2 illustrates a cross-sectional view of a process cartridge assembly in FIG. 1.
Figure 3:
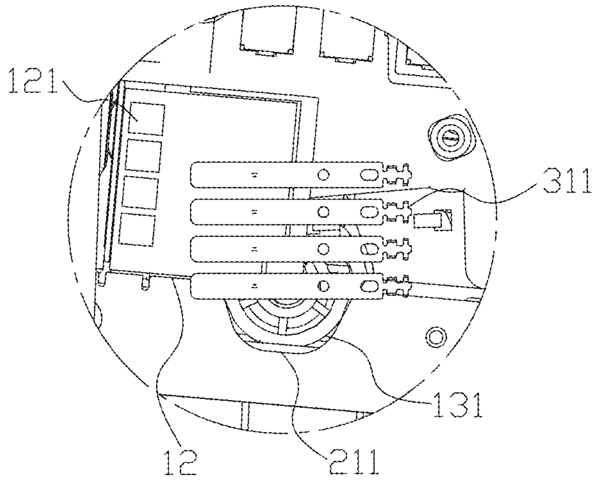
FIG. 3 illustrates an enlarged schematic of a region A in FIG. 2.

As shown in FIG. 2, during the process of installing the process cartridge 1 in the main body 31 or pulling the process cartridge 1 from the main body 31 along with the moving part 2, due to different user operations, the moving part 2 may not necessarily move horizontally during the process of pushing in or pulling out the main body 31, which may cause the moving part 2 to tilt to a certain extent and cause the positioning portion 13 to be lifted. Therefore, the positioning portion 13 may collide with the electrical contact portion 311 on the main body 31 during the movement of the moving part 2. As a result, the electrical contact portion 311 may be damaged or debris may adhere to the electrical contact portion 311 after the process cartridge 1 is scratched, which may affect the data transmission between the chip part 12 and the main body 31.

Figure 8:
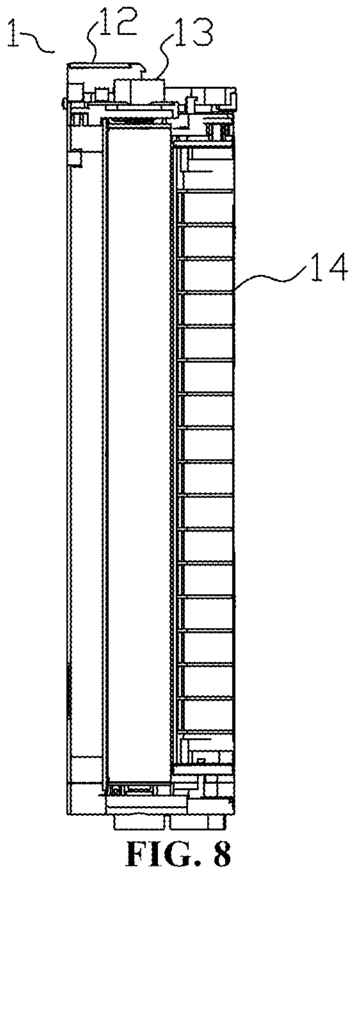
FIG. 8 illustrates a structural schematic of a process cartridge provided by exemplary embodiments of the present disclosure.
Figure 9:
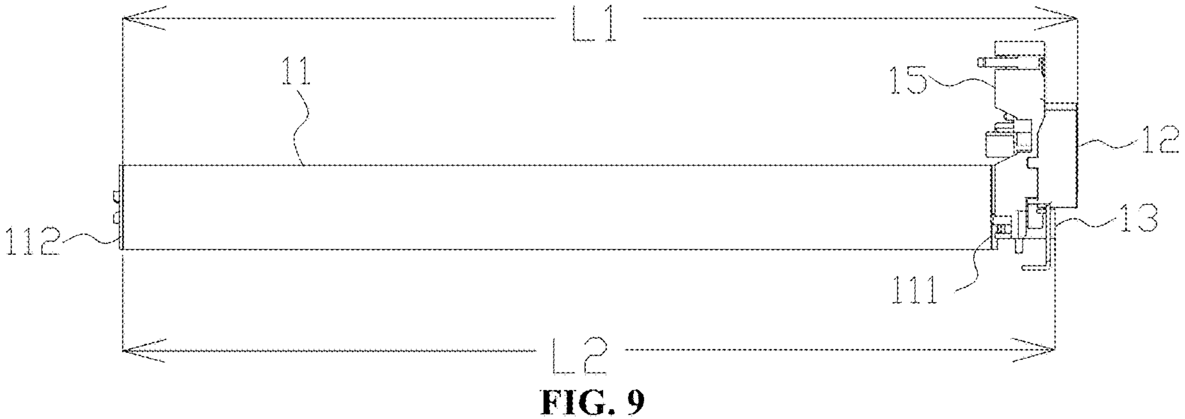
FIG. 9 illustrates a position schematic of a rotating part, a chip part and a positioning portion in FIG. 8

To solve above-mentioned problem, in the process cartridge 1 provided embodiments of the present disclosure, the positional relationship between the chip part 12 and the positioning portion 13 on the process cartridge 1 may be limited. As shown in FIGS. 8-9, the process cartridge 1 may include a cartridge main body 14 and a rotating part 11; the rotating part 11 may be disposed at the cartridge main body 14; the rotating part 11 in the process cartridge 1 may be configured as a reference axis; along the axial direction of the rotating part 11, the rotating part 11 may include a first portion 111 and a second portion 112. The positioning portion 13 may be disposed at the first portion 111. The chip part 12 may include the contact point portion 121 for being in contact with and electrically connected to the electrical contact portion 311 of the image-forming apparatus 3. The positioning portion 13 may be configured to be supported on the moving part of the image-forming apparatus 3. When the process cartridge 1 is installed in the image-forming apparatus 3, any point on the second portion 112 may be configured as a reference point, the distance between projections of the contact point portion 121 and the reference point onto the axle of the rotating part 11 is L1, and the minimum distance between projections of the surface of the positioning portion 13 away from the second portion 112 and the reference point onto the axle of the rotating part 11 is L2, where L1>L2.

Optionally, the contact point portion 121 may be fixedly disposed relative to the cartridge main body 14; or the contact point portion 121 may also be movably disposed relative to the cartridge main body 14. Obviously, when the process cartridge 1 is installed in the image-forming apparatus 3, both disposing manners may need to satisfy L1>L2.

Optionally, the rotating part 11 may be a photosensitive drum. In addition, the rotating part 11 may also be another part on the process cartridge 1 that may rotate and be in parallel with the axial direction of the photosensitive drum, such as a developing roller.

Since the process cartridge 1 is lifted during the process of being installed in the image-forming apparatus 3, a part of the positioning portion 13 and a part of the electrical contact portion 311 may be at same height, which may result in that the part of the positioning portion 13 may collide with the part of the electrical contact portion 311, thereby causing damage to the electrical contact portion 311. In one embodiment, using any point on the second portion 112 of the rotating part 11 as the reference point, it may satisfy that along the axial direction of the rotating part 11, the distance from the contact point portion 121 on the chip part 12 to the reference point may be greater than the minimum distance from the side of the positioning portion 13 away from the second portion 111 to the reference point, such that the positioning portion 13 may be away from the electrical contact portion 311 relative to the contact point portion 121. Since the contact point portion 121 is electrically connected to the electrical contact portion 311, the positioning portion 13 may be farther away from the electrical contact portion 311 than the contact point portion 121, which may ensure that when the process cartridge 1 is installed in the image-forming apparatus 3, the positioning portion 13 may not collide with the electrical contact portion 311 on the main body 31, thereby avoiding affecting the electrical connection between the contact point portion 121 and the electrical contact portion 311. Furthermore, the positioning portion 13 may be farther away from the electrical contact portion 311 than the contact point portion 12. In such way, the possibility of positional interference between the positioning portion 13 and the electrical contact portion 311 during the process of installing the process cartridge 1 may be reduced; the positioning portion 13 of the process cartridge 1 may be prevented from being scraped to form debris which may be in contact with the contact point portion 121 and the electrical contact portion 311 to result in the risk of unstable electrical connection between the contact point portion 121 and the electrical contact portion 311; and the stability of data transmission between the chip part 12 on the process cartridge 1 and the main body 31 may be ensured.

Optionally, L1>L2 may be also satisfied when the process cartridge 1 is removed from the image-forming apparatus 3.

Furthermore, the chip part 12 may include a chip main body, and the contact point portion 121 may be directly disposed on the chip main body.

Or the chip part 12 may also include a connecting part. The connecting part may be electrically connected to the chip main body and the electrical contact portion 311 respectively. The contact point portion 121 may be a portion of the connecting part configured for electrical connection with the electrical contact portion 311, such that it realizes that the contact point portion 121 may be indirectly disposed on the chip main body. By adding the connecting part to electrically connect the chip main body to the electrical contact portion 311, the case that the chip main body is not connected to the electrical contact portion 311 may be avoided, and the stability of the electrical connection between the chip main body and the electrical contact portion 311 may be improved. At this point, the contact point portion 121 may be fixedly disposed relative to the chip main bod; or the contact point portion 121 may also move relative to the chip main body, such that the contact point portion 121 may move relative to the cartridge main body 14. For example, the connecting part may be an elastic piece. When the process cartridge 1 is not installed in the image-forming apparatus 3, the connecting part may be in a compressed state; and when the process cartridge 1 is installed in the image-forming apparatus 3, the connecting part may be not pressed, such that the electrical contact portion 311 on the connecting part may move relative to the chip main body.

In some embodiments, the contact point portion 121 and the positioning portion 13 may protrude from the end surface of the cartridge main body 14 along the axial direction of the rotating part 11. In one embodiment, the positioning portion 13 may protruding from the end surface of the cartridge main body 14 along the axial direction of the rotating part 11, such that when the process cartridge 1 is installed in the moving part 2, the positioning portion 13 may be matched with the limiting portion 21 of the moving part 2. The contact point portion 121 may be configured to protrude from the end surface of the cartridge main body 14, such that when the process cartridge 1 is installed in the main body 31, the contact point portion 121 may be electrically connected to the electrical contact portion 311. Since the distance between the projection of the reference point and the projection of each of the contact point portion 121 and the positioning portion 13 onto the axle of the rotating part 11 satisfies L1>L2, the contact point portion 121 may be at the surface of the process cartridge 1 that is farthest from the reference point. That is, the distance from any other part of the process cartridge 1 to the reference point may be not greater than the distance from the contact point portion 121 to the reference point, which ensures that when the process cartridge 1 is installed in the main body 31, other parts of the process cartridge 1 except the contact point portion 121 may not collide with the electrical contact portion 311 on the main body 31.

Furthermore, the distance between projections of the end surface of the first portion 111 and the reference point onto the axle of the rotating part 11 is La, where L1>L2>La. That is, along the axial direction of the rotating part 11, the distance between the side of the contact point portion 121 away from the second portion 112 and the reference point may be greater than the distance between the side of the positioning portion 13 away from the second portion 112 and the reference point, such that the positioning portion 13 may be closer to the reference point relative to the contact point portion 121, which may prevent the positioning portion 13 from being in contact with the electrical contact portion 311 to affect the electrical connection of the contact point portion 121 and the electrical contact portion 311 when the process cartridge 1 is installed in the image-forming apparatus 3. The distance between the side of the positioning portion 13 away from the second portion 112 and the reference point may be greater than the distance between the first portion 111 and the reference point, such that the positioning portion 13 may protrude relative to the first portion 111, which facilitate matching between the positioning portion 13 and the limiting portion 21 of the moving part 2.

Figure 10:
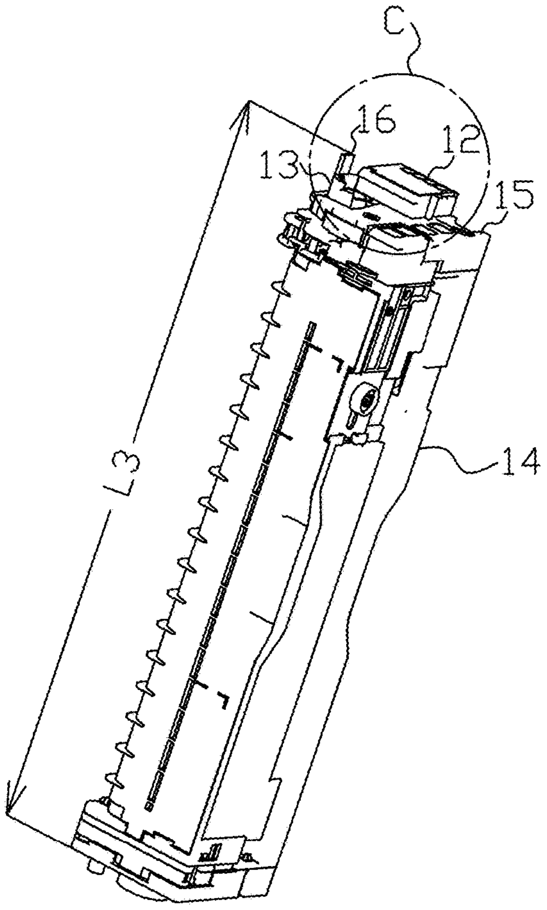
FIG. 10 illustrates another structural schematic of a process cartridge provided by exemplary embodiments of the present disclosure.

As shown in FIG. 10, in some embodiments, the process cartridge 1 may further include a chip bracket 15, and the chip part 12 may be mounted on the chip bracket 15. The chip bracket 15 and the positioning portion 13 may be separate structures, which may be both fixed to the cartridge main body 14. Optionally, the chip bracket 15 and the positioning portion 13 may also be a single structure. The chip bracket 15 and the positioning portion 13 may be formed into a single piece using a mold, which may improve efficiency compared to forming the chip bracket 15 and the positioning portion 13 separately. When the chip bracket 15 and the positioning portion 13 are formed into a single piece, a part of the chip bracket 15 may extend along the direction away from the chip part 12 to form the positioning portion 13.

In some embodiments, the surface of the positioning portion 13 away from the second portion 112 may include a first region and a second region. The first region may be on the side of the second region away from the chip part 12. That is, the first region may be the region which is at the surface of the positioning portion 13 away from the second portion 112 and is not overlapped with the projection of the electrical contact portion 311 onto the axle of the rotating part 11 when the process cartridge 1 is installed in the image-forming apparatus 3. The second region may be the region which is at the surface of the positioning portion 13 away from the second portion 112 and is overlapped with the projection of the electrical contact portion 311 onto the axle of the rotating part 11 when the process cartridge 1 is installed in the image-forming apparatus 3. The distance between the second region and the reference point along the axial direction of the rotating part 11 may be less than L1, thereby limiting collision between the second region and the electrical contact portion 311.

Furthermore, the surface of the positioning portion 13 away from the second portion 112 may be an annular surface or a circular surface with a gap; the gap may be on the side of the annular surface or the circular surface adjacent to the chip part 12; and the part of the annular surface or the circular surface adjacent to the gap may be the second region.

Figure 11:
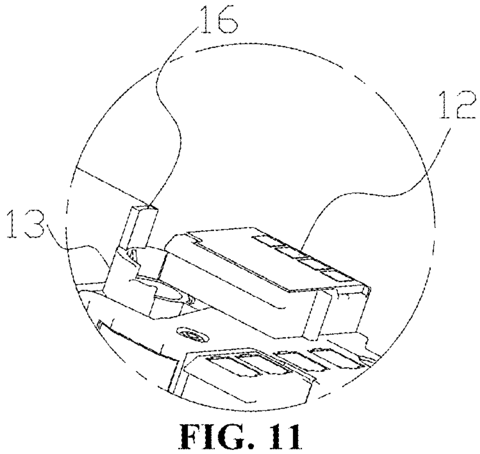
FIG. 11 illustrates an enlarged schematic of a region C in FIG. 10.
Figure 12:
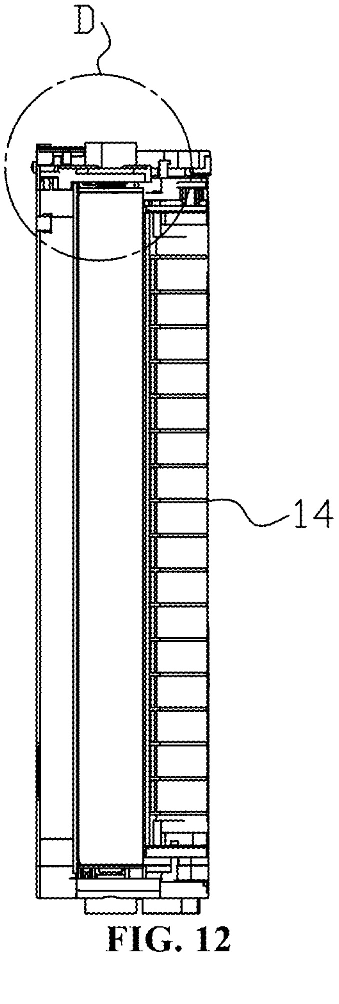
FIG. 12 illustrates a structural schematic of a process cartridge not installed in a main body of an image-forming apparatus provided by exemplary embodiments of the present disclosure.

As shown in FIGS. 10-11, furthermore, the first region may further include a protrusion 16 which may extend along the positioning portion 13 along the direction away from the second portion 112. When the process cartridge 1 is installed in the image-forming apparatus 3, the projections of the protrusion 16 and the electrical contact portion 311 onto the axle of the rotating part 11 may not be overlapped with each other. As shown in FIG. 11, along the radial direction of the rotating part 11, the protrusion 16 may be disposed on the side of the positioning portion 13 away from the chip part 12. In addition, when the process cartridge 1 is installed in the main body 31, the projections of the protrusion 16 and the electrical contact portion 311 onto the axle of the rotating part 11 may not be overlapped with each other. Even if the protrusion 16 is lifted along with the moving part 2, the protrusion 16 may not have position interfere with the electrical contact portion 311 in the main body 31.

Referring FIGS. 9-10, the distance from the side of the protrusion 16 away from the first portion 111 to the reference point is L3 satisfies L3≥L1. That is, the distance from the side of the protrusion 16 away from the first portion 111 to the reference point may be greater than the distance from the side of the contact point portion 121 away from the first portion 111 to the reference point. The protrusion 16 may protrude relative to the contact point portion 121 and guide the process cartridge 1 to be installed in the moving part 2. Moreover, the protrusion 16 may also be configured as a force application point, and the process cartridge 1 may be detached from the moving part 2 by lifting the protrusion 16.

Referring to FIGS. 12-15, in some embodiments, the process cartridge 1 may further include a pressing mechanism. The pressing mechanism may be installed at the chip bracket 15 and drive the chip part 12 to move relative to the chip bracket 15. When the process cartridge 1 is not installed in the image-forming apparatus 3, the pressing mechanism may press the chip part 12 to satisfy L2≥L1. In one embodiment, when the process cartridge 1 is not installed in the printer body 31, the chip part 12 may be pressed by the pressing mechanism to be in a compressed state. In such way, the distance between the contact point portion 121 and the reference point may be less than the distance between the positioning portion 13 and the reference point, which may protect the contact point portion 121 and reduce the collision risk of the contact point portion 121 due to protrusion. During the process of installing the process cartridge 1 in the main body 31, the chip part 12 may be released by the pressing mechanism. The contact point portion 121 may be pushed toward a position away from the reference point, such that the distance from the contact point portion 121 to the reference point may be greater than the distance from the positioning portion 13 to the reference point.

Figure 13:
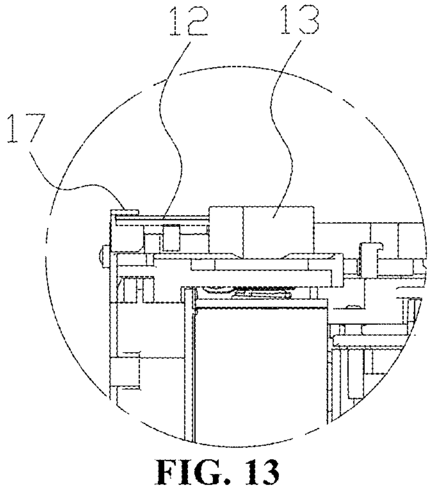
FIG. 13 illustrates an enlarged schematic of a region D in FIG. 12.
Figure 14:
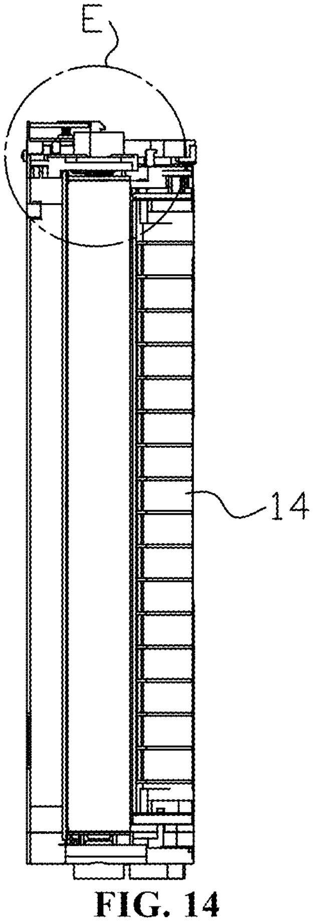
FIG. 14 illustrates a structural schematic of a process cartridge installed in a main body of an image-forming apparatus provided by exemplary embodiments of the present disclosure.
Figure 15:
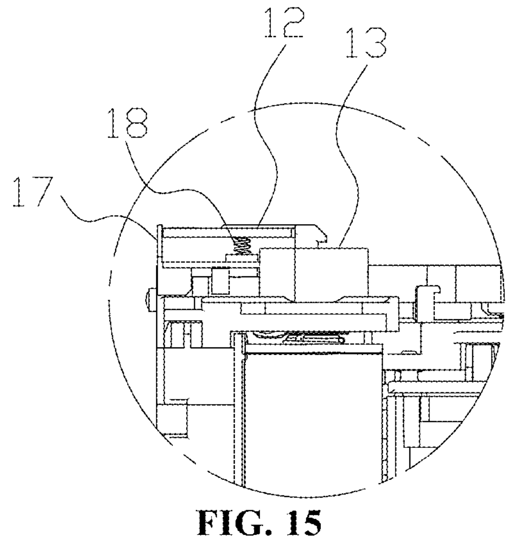
FIG. 15 illustrates an enlarged schematic of a region E in FIG. 14.

For example, referring to FIGS. 13 and 15, the pressing mechanism may include an elastic part 18 and a locking part 17; the elastic part 18 may be disposed between the chip part 12 and the chip bracket 15; and the locking part 17 may be connected to the side end of the chip part 12 along the radial direction of the rotating part 11. When the process cartridge 1 is not installed in the image-forming apparatus 3, the locking part 17 may overcome the elastic force of the elastic part 18 to press the chip part 12, such that L2≥L1 may be satisfied. The pressing mechanism may actually press the chip main body of the chip part 12. When the process cartridge 1 is installed in the image-forming apparatus 3, the chip part 12 may be released by the locking part 17, and the elastic part 18 may drive the contact point portion 121 to move away from the rotating part 11 through its own elastic force, such that L1>L2 may be satisfied. The elastic part 18 may be a spring.

In one embodiment, the pressing mechanism may be, for example, a pressing structure in existing pressing pen. The chip part 12 may be pressed, such that the chip part 12 may be locked by the locking part 17 in a compressed state. At this point, the elastic part 18 may be also in a compressed state. When the process cartridge is installed in the image-forming apparatus, the protruding structure in the image-forming apparatus may press the chip part 12 again, the chip part 12 may be released by the locking part 17, and the compression of the elastic part 18 may be also released, such that the elastic part 18 may drive the chip part 12 to move through the elastic force.

In another embodiment, when the process cartridge 1 is not installed in the image-forming apparatus 3, the locking part 17 may be at least partially on the side of the chip part 12 away from the second portion 112 and abutted against the chip part 12. At this point, the elastic part 18 may be pressed. When the process cartridge 1 is installed in the image-forming apparatus 3, the protruding structure in the image-forming apparatus 3 may push the locking part 17 to separate the locking part 17 from the chip part 12 and release the compression of the elastic part 18, such that the elastic part 18 may drive the chip part 12 to move through the elastic force.

Moreover, when the contact point portion 121 is configured to move relative to the chip part 12, the locking part 17 may also press the connecting part or the contact point portion 121, such that the contact point portion 121 may be in a compressed state when the process cartridge 1 is not installed in the image-forming apparatus 3; and the limitation of the contact point portion 121 by the locking part 17 may be released when the process cartridge 1 is installed in the image-forming apparatus 3, such that the contact point portion 121 may move relative to the chip part 12.

Compared with the existing technology, the technical solutions provided by the present disclosure may achieve at least following beneficial effects.

In the present disclosure, by limiting that the distance from the contact point portion to the reference point is greater than the distance from the reference point to the surface of the positioning portion away from the first portion, the positioning portion may be disposed away from the electrical contact portion relative to the contact point portion, which may ensure that the positioning portion may not collide with the electrical contact portion during the process of installing the process cartridge in the image-forming apparatus and further ensure the electrical connection stability between the contact point portion and the electrical contact portion.

The above may be only optional embodiments of the present disclosure and may not intended to limit the present disclosure. Any changes or substitutions, which are made by those skilled in the art and within the spirit and principle of the present disclosure, shall be included in the protection scope of the present disclosure.

What is claimed is:

1. A process cartridge, applied to an image-forming apparatus, comprising:
- a cartridge main body;
- a rotating part, disposed on the cartridge main body, wherein along an axial direction of the rotating part, the cartridge main body includes a first portion and a second portion;
- a chip part, wherein the chip part is disposed on the cartridge main body and includes a contact point portion for being in contact with and electrically connected to an electrical contact portion of the image-forming apparatus; and
- a positioning portion, wherein the positioning portion is at the first portion and configured to be supported on a moving part of the image-forming apparatus, wherein:
  - when the process cartridge is installed in the image-forming apparatus, any point on the second portion is configured as a reference point, a distance between projections of the contact point portion and the reference point onto an axle of the rotating part is L1, and a minimum distance between projections of the reference point and a surface of the positioning portion away from the second portion to onto the axle of the rotating part is L2, wherein L1>L2.

2. The process cartridge according to claim 1, wherein:
- the contact point portion is fixedly disposed relative to the cartridge main body; or
- the contact point portion is movably disposed relative to the cartridge main body.

3. The process cartridge according to claim 1, wherein:
- the chip part includes a chip main body, and the contact point portion is disposed on the chip main body; or
- the chip part includes a chip main body and a connecting part; the connecting part is configured to be electrically connected to the chip main body and the electrical contact portion respectively; and the contact point portion is a portion of the connecting part configured to be in contact with and electrically connected to the electrical contact portion.

4. The process cartridge according to claim 1, wherein:
- the contact point portion and the positioning portion protrude from an end surface of the cartridge main body along the axial direction of the rotating part.

5. The process cartridge according to claim 4, wherein:

a distance between projections of an end surface of the first portion and the reference point onto the axle of the rotating part is La, wherein L1>L2>La.

6. The process cartridge according to claim 1, wherein:

the process cartridge further includes a chip bracket, and the chip part is installed at the chip bracket; and the chip bracket and the positioning portion are disposed separately or formed into a single piece.

7. The process cartridge according to claim 1, wherein:

a surface of the positioning portion away from the second portion includes a first region and a second region; the first region is on a side of the second region away from the chip part; and a distance between projections of the second region and the reference point onto the axle of the rotating part is less than L1.

8. The process cartridge according to claim 7, wherein:

a protrusion is disposed at the first region and extends along the positioning portion along a direction away from the second portion; and when the process cartridge is installed in the image-forming apparatus, projections of the protrusion and the electrical contact portion onto the axle of the rotating part are not overlapped with each other.

9. The process cartridge according to claim 8, wherein:

a distance from the reference point to a side of the protrusion away from the second portion is L3, wherein L3>L1.

10. The process cartridge according to claim 1, further including:

a pressing mechanism, wherein when the process cartridge is not installed in the image-forming apparatus, the pressing mechanism presses the chip part to satisfy L2≥L1.

11. The process cartridge according to claim 10, wherein:

the pressing mechanism includes an elastic part and a locking part;

when the process cartridge is not installed in the image-forming apparatus, the locking part is capable of overcoming an elastic force of the elastic part to press the chip part to satisfy L2≥L1; and when the process cartridge is installed in the image-forming apparatus, the chip part is capable of being released by the locking part; and the elastic part drives the contact point portion, through the elastic force of the elastic part, to move along a direction away from the rotating part to satisfy L1>L2.

12. A process cartridge assembly, comprising:

a moving part; and a process cartridge, installed in the moving part and applied to an image-forming apparatus, comprising:

a cartridge main body;

a rotating part, disposed on the cartridge main body, wherein along an axial direction of the rotating part, the cartridge main body includes a first portion and a second portion;

a chip part, wherein the chip part is disposed on the cartridge main body and includes a contact point portion for being in contact with and electrically connected to an electrical contact portion of the image-forming apparatus; and a positioning portion, wherein the positioning portion is at the first portion and configured to be supported on a moving part of the image-forming apparatus, wherein:

when the process cartridge is installed in the image-forming apparatus, any point on the second portion is configured as a reference point, a distance between projections of the contact point portion and the reference point onto an axle of the rotating part is L1, and a minimum distance between projections of the reference point and a surface of the positioning portion away from the second portion to onto the axle of the rotating part is L2, wherein L1>L2; and the moving part is disposed with a limiting portion, and the positioning portion of the process cartridge is supported at the limiting portion.

13. The process cartridge assembly according to claim 12, wherein:

a portion of the moving part is recessed to form the limiting portion; and a first limiting surface is formed at an inner surface of the limiting portion; a first limited surface is formed at an inner surface of the positioning portion; and when the process cartridge is installed in the moving part, the first limiting surface is abutted against the first limited surface.

14. An image-forming apparatus, comprising:

a main body, disposed with a moving part and an electrical contact portion; and a process cartridge, comprising:

a cartridge main body;

a rotating part, disposed on the cartridge main body, wherein along an axial direction of the rotating part, the cartridge main body includes a first portion and a second portion;

a chip part, wherein the chip part is disposed on the cartridge main body and includes a contact point portion for being in contact with and electrically connected to the electrical contact portion of the image-forming apparatus; and a positioning portion, wherein the positioning portion is at the first portion and configured to be supported on the moving part of the image-forming apparatus, wherein:

when the process cartridge is installed in the image-forming apparatus, any point on the second portion is configured as a reference point, a distance between projections of the contact point portion and the reference point onto an axle of the rotating part is L1, and a minimum distance between projections of the reference point and a surface of the positioning portion away from the second portion to onto the axle of the rotating part is L2, wherein L1>L2; and when the process cartridge is installed in the moving part, the contact point portion is electrically connected to the electrical contact portion.

* * * * *